(12) United States Patent
Nunnink

(10) Patent No.: US 9,076,199 B2
(45) Date of Patent: Jul. 7, 2015

(54) SYSTEM AND METHOD FOR DETERMINING AND CONTROLLING FOCAL DISTANCE IN A VISION SYSTEM CAMERA

(71) Applicant: Laurens Nunnink, Simpleveld (NL)

(72) Inventor: Laurens Nunnink, Simpleveld (NL)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 14/042,943

(22) Filed: Oct. 1, 2013

(65) Prior Publication Data

US 2014/0218590 A1      Aug. 7, 2014

Related U.S. Application Data

(63) Continuation of application No. 13/563,499, filed on Jul. 31, 2012, now Pat. No. 8,576,390.

(51) Int. Cl.

| | |
|---|---|
| G01B 9/00 | (2006.01) |
| G06T 7/00 | (2006.01) |
| G01M 11/02 | (2006.01) |
| H04N 5/232 | (2006.01) |
| G03B 3/10 | (2006.01) |
| G03B 43/00 | (2006.01) |
| G02B 3/14 | (2006.01) |
| H04N 17/00 | (2006.01) |

(52) U.S. Cl.
CPC ......... *G06T 7/0018* (2013.01); *G01M 11/0228* (2013.01); *G02B 3/14* (2013.01); *H04N 5/23212* (2013.01); *H04N 17/002* (2013.01); *G03B 3/10* (2013.01); *G03B 43/00* (2013.01)

(58) Field of Classification Search
CPC ............... G02B 3/14; G02B 27/017; G02B 2027/0178; G02B 2027/014; G02B 27/0093; G02B 7/028; G02B 7/36; G02B 2027/0118; G02B 2027/0127; G02B 7/102; G02B 2027/0187; G02B 7/00; G02B 2027/0123
See application file for complete search history.

(56) References Cited

U.S. PATENT DOCUMENTS

| | | | | |
|---|---|---|---|---|
| 4,855,776 | A | * | 8/1989 | Akashi ............................ 396/91 |
| 5,061,062 | A | * | 10/1991 | Schneiter ..................... 356/3.05 |
| 5,710,662 | A | * | 1/1998 | Nishida ........................ 359/368 |
| 6,104,880 | A | * | 8/2000 | Kamishita et al. ............ 396/133 |
| 7,829,835 | B2 | * | 11/2010 | Hirai .......................... 250/208.1 |
| 7,972,018 | B2 | * | 7/2011 | Sajadi et al. .................. 353/101 |

(Continued)

FOREIGN PATENT DOCUMENTS

JP         08-075980         3/1996

*Primary Examiner* — Michael P Stafira
(74) *Attorney, Agent, or Firm* — Loginov & Associates PLLC

(57) ABSTRACT

This invention provides a system and method for determining and controlling focal distance in a lens assembly of a vision system camera using an integral calibration assembly that provides the camera's image sensor with optical information that is relative to focal distance while enabling runtime images of a scene to be acquired along the image axis. The lens assembly includes a variable lens located along an optical axis that provides a variable focus setting. The calibration assembly generates a projected pattern of light that variably projects upon the camera sensor based upon the focus setting of the variable lens. That is, the appearance and/or position of the pattern varies based upon the focus setting of the variable lens. This enables a focus process to determine the current focal length of the lens assembly based upon predetermined calibration information stored in association with a vision system processor running the focus process.

15 Claims, 10 Drawing Sheets

(56) References Cited

U.S. PATENT DOCUMENTS 8,258,448 B2 * 9/2012 Nagahama et al. ........ 250/201.2
8,508,652 B2 * 8/2013 Albu et al. .................... 348/349
8,576,390 B1 * 11/2013 Nunnink ....................... 356/126
2011/0181636 A1 * 7/2011 Fukazawa .................... 345/697

* cited by examiner

SYSTEM AND METHOD FOR DETERMINING AND CONTROLLING FOCAL DISTANCE IN A VISION SYSTEM CAMERA

This application is a continuation of U.S. patent application Ser. No. 13/563,499, titled "System and Method for Determining and Controlling Focal Distance in a Vision System Camera," filed on Jul. 31, 2012, the entire contents of which is incorporated herein by reference.

FIELD OF THE INVENTION

This invention relates to automatic focusing systems for camera lenses and more particularly to automatic focusing lens systems in vision system cameras employing liquid lens assemblies.

BACKGROUND OF THE INVENTION

Vision systems that perform measurement, inspection, alignment of objects and/or decoding of symbology (e.g. bar codes) are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of a symbology (barcode) reader, the user or automated process acquires an image of an object that is believed to contain one or more barcodes. The image is processed to identify barcode features, which are then decoded by a decoding process and/or processor obtain the inherent alphanumeric data represented by the code.

Often, a vision system camera includes an internal processor and other components that allow it to act as a standalone unit, providing a desired output data (e.g. decoded symbol information) to a downstream process, such as an inventory tracking computer system. It is desirable that the camera assembly contain a lens mount, such as the commonly used C-mount, that is capable of receiving a variety of lens configurations so that it can be adapted to the specific vision system task. The choice of lens configuration can be driven by a variety of factors driven by such factors as lighting/illumination, field of view, focal distance, relative angle of the camera axis and imaged surface, and the fineness of details on the imaged surface. In addition, the cost of the lens and/or the available space for mounting the vision system can also drive the choice of lens.

An exemplary lens configuration that can be desirable in certain vision system applications is the automatic focusing (auto-focus) assembly. By way of example, an auto-focus lens can be facilitated by a so-called liquid lens assembly. One form of liquid lens uses two iso-density liquids—oil is an insulator while water is a conductor. The variation of voltage passed through the lens by surrounding circuitry leads to a change of curvature of the liquid-liquid interface, which in turn leads to a change of the focal length of the lens. Some significant advantages in the use of a liquid lens are the lens' ruggedness (it is free of mechanical moving parts), its fast response times, its relatively good optical quality, and its low power consumption and size. The use of a liquid lens can desirably simplify installation, setup and maintenance of the vision system by eliminating the need to manually touch the lens. Relative to other autofocus mechanisms, the liquid lens has extremely fast response times. It is also ideal for applications with reading distances that change from object-to-object (surface-to-surface) or during the changeover from the reading of one object to another object.

A recent development in liquid lens technology is available from Optotune AG of Switzerland. This lens utilizes a movable membrane covering a liquid reservoir to vary its focal distance. This lens advantageously provides a larger aperture than competing designs and operates faster. However, due to thermal drift and other factors, the liquid lens may lose calibration and focus over time.

One approach to refocusing a lens after loss of calibration/focus is to drive the lens incrementally to various focal positions and measure the sharpness of an object, such as a runtime object or calibration target. However, this requires time and effort that takes away from runtime operation, and can be an unreliable technique (depending in part on the quality of illumination and contrast of the imaged scene).

It is therefore desirable to provide a system and method for stabilizing the focus of a liquid (or other auto-focusing) lens type that can be employed quickly and at any time during camera operation. This system and method should allow a lens assembly that mounts in a conventional camera base mount and should avoid and significant loss of performance in carrying out vision system tasks. The system and method should allow for focus over a relatively wide range (for example 20 cm to 2 m) of reading distance.

SUMMARY OF THE INVENTION

This invention overcomes disadvantages of the prior art by providing a system and method for determining and controlling focal distance in a lens assembly of a vision system camera using an integral calibration assembly that provides the camera's image sensor with optical information that is relative to focal distance while enabling runtime images of a scene to be acquired along the image axis. In an illustrative embodiment, a system and method for determining focal distance of a lens assembly includes a variable lens located along an optical axis of the lens assembly that provides a variable focus setting. This variable lens can be associated with a fixed imager lens positioned along the optical axis between the variable lens and a camera sensor. A novel calibration assembly integral with the lens assembly is provided. The calibration assembly generates a projected pattern of light that variably projects upon the camera sensor based upon the focus setting of the variable lens. That is, the appearance and/or position of the pattern varies based upon the focus setting of the variable lens. This enables a focus process to determine the current focal length of the lens assembly based upon predetermined calibration information stored in association with a vision system processor running the focus process. The calibration assembly can be located along a side of the lens so as to project the pattern of light from an orthogonal axis approximately perpendicular to the optical axis through a reflecting surface onto the optical axis. This reflecting surface can comprise a prism, mirror and/or beam splitter that covers all or a portion of the filed of view of the lens assembly with respect to an object on the optical axis. The pattern can be located on a calibration target that is located along the orthogonal axis and is remote from the reflecting surface.

Illustratively, the calibration target can define alternating transparent and opaque regions and can be illuminated (e.g.

backlit by an LED illuminator). This target is illustratively oriented along an acute slant angle with respect to a plane perpendicular to the orthogonal axis so that pattern elements of the target (e.g. parallel lines) are each associated with a predetermined focal distance. For a given focal distance, the sharpness of a plurality of adjacent line pairs is evaluated. The sharpest pair represents the current focal distance. An intervening calibration assembly lens can resolve the light rays from the calibration target before they strike the beam splitter so as to provide the desired range of focal distances at the sensor (e.g. 20 cm-2 m (or infinity)). Illustratively the target can be illuminated by light of a predetermined wavelength (visible or non-visible), and the focus process distinguishes the predetermined wavelength so that calibration can potentially run without interfering with regular runtime imaging of objects.

In another embodiment, the calibration assembly can include a projected "pattern" defined generally as a spherical wave front. The lens assembly includes at least one micro lens, and generally a plurality of micro lenses each defining a portion of a wave front sensor that is oriented to project the pattern onto a predetermined portion of the camera sensor. Typically this portion is near an outer edge of the sensor so that it minimally interferes with the field of view used for runtime image acquisition.

The system and method can further include, within the focus process, a control process that controls and/or adjusts the focus setting of the variable lens based upon the determined focal distance and a desired focal distance for the lens assembly. The variable lens can be a liquid lens, or other movable geometry lens, and more particularly can comprise a membrane-based liquid lens.

BRIEF DESCRIPTION OF THE DRAWINGS

The invention description below refers to the accompanying drawings, of which.

DETAILED DESCRIPTION

Figure 1:
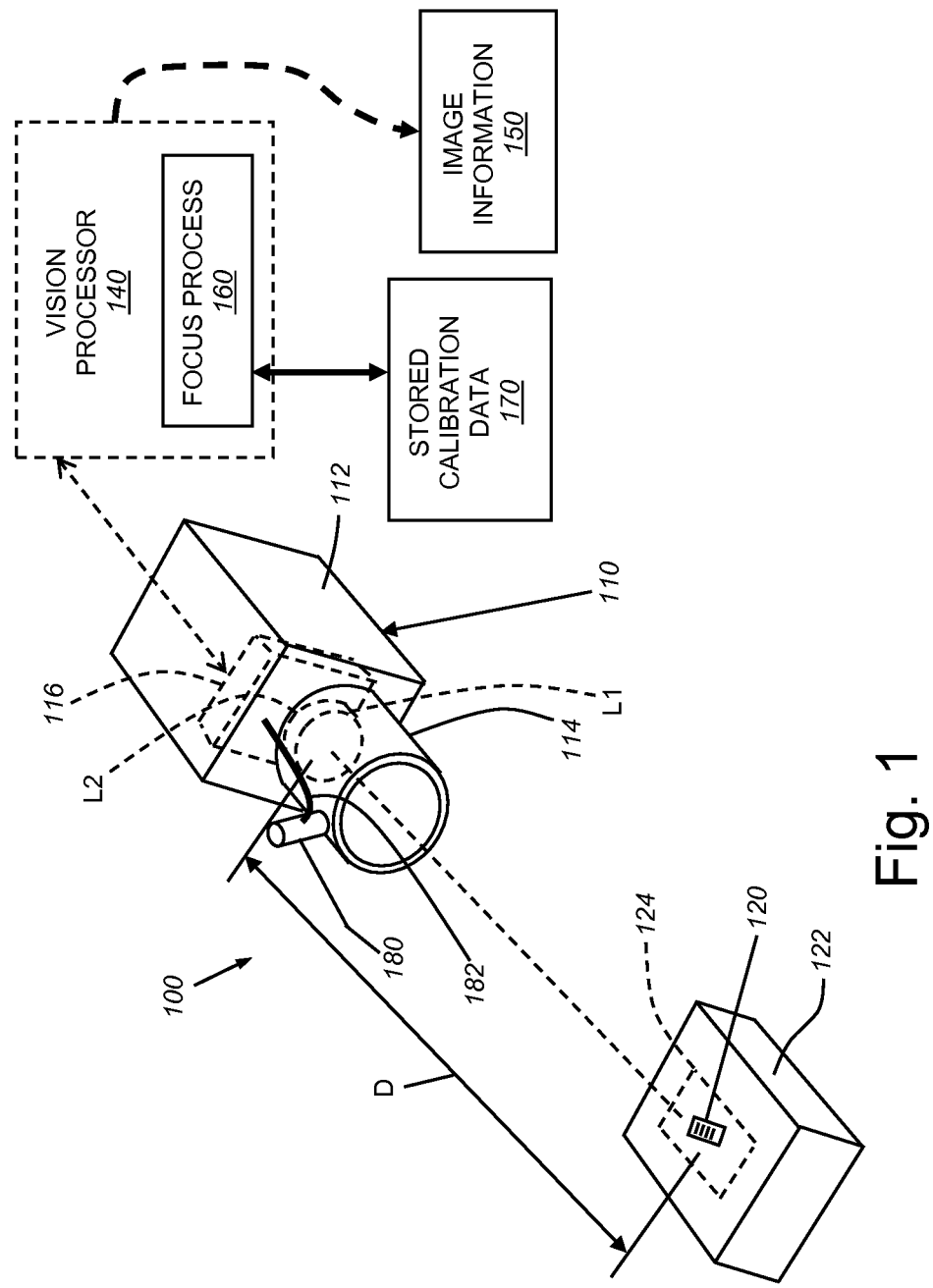
FIG. 1 is a schematic perspective view of a vision system camera including a lens arrangement for determination and control of focal distance according to an embodiment herein, shown acquiring images of an object in a scene.

FIG. 1 shows a vision system arrangement 100 according to an illustrative embodiment. The arrangement 100 includes a vision system, camera 110 having a camera body 112 that mounts a lens assembly 114. The lens assembly 114 is part of an optical package that also includes an internal image sensor 116 (shown in phantom) within the body 112. The sensor and lens are aligned along an optical axis OA as shown, with the sensor defining a perpendicular focal plane with respect to the axis OA. The axis OA is shown passing approximately through an exemplary feature of interest 120 (e.g. a barcode) on an object 122. The feature 120 resides within a field of view (dashed box 124) that can vary in size depending upon the vision system task. The size of the field of view is, in part dependent upon the reading/viewing distance D between the object 122 and the focal point of the lens assembly 114. In this embodiment, the lens assembly 114 includes a pair of lenses L1 and L2 (both shown in phantom and described in detail below) that focus light from the imaged scene onto the sensor 116. The sensor transmits captured image data to a vision processor 140 (also shown in phantom) that performs vision system processes on the image data (e.g. ID finding, alignment, inspection, etc.) based upon programmed vision system tools and processes, and outputs desired image information 150 that can be used in downstream processes and applications, such as ID decoding and handling. The processor 140 can be entirely self-contained within the camera body 112, partially contained within the body, or external to the body—such as a standalone computer (e.g. a PC) or other remote computing device. Appropriate wired and/or wireless communication links are provided between the sensor assembly 116 processor 140 and other downstream image-data-processing and/or image-data-handling components. The processor can also control other typical functions such as internal or external illumination (not shown), triggering, etc.

As used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software.

Figure 2:
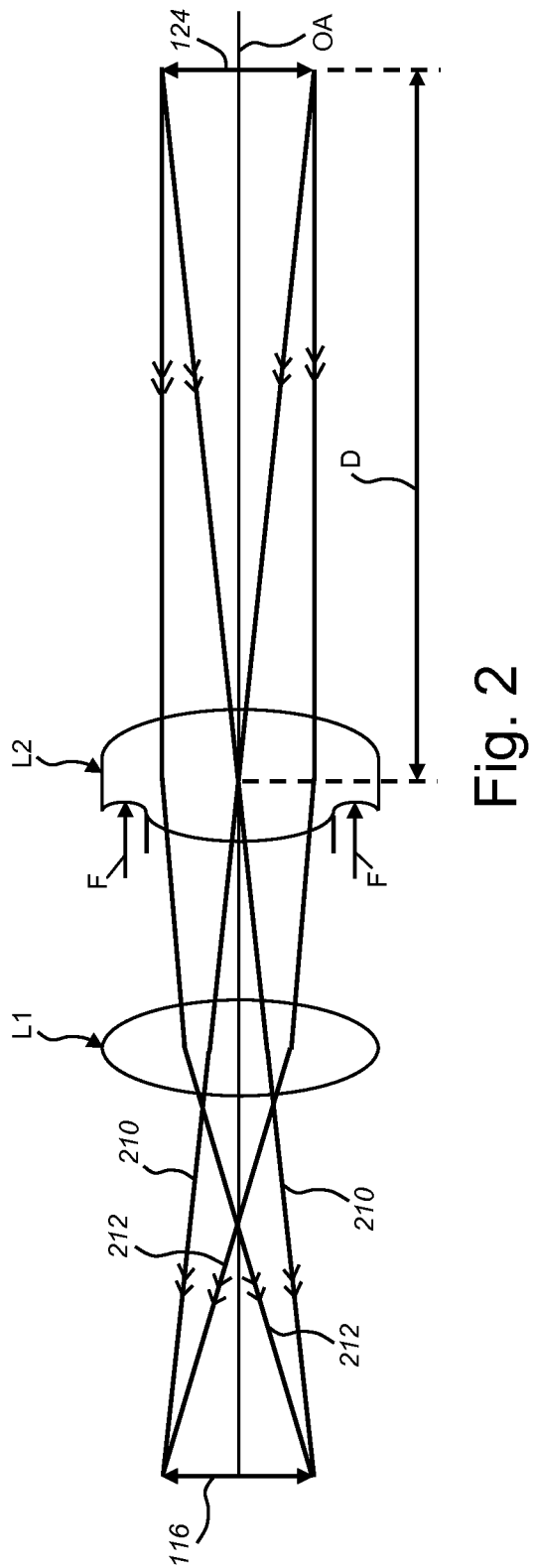
FIG. 2 is a schematic diagram of a lens arrangement according to an embodiment herein including a membrane-based liquid lens and a fixed imager lens oriented along an optical axis between an object and a camera image sensor.

With reference to the schematic diagram of FIG. 2, the arrangement of lenses L1 and L2 with respect to the object field of view 124 and the exposed area of the sensor 116 is shown in further detail. Each of the components is aligned with the optical axis OA as shown, the sensor 116 being perpendicular thereto, and forming an image plane. In this illustrative arrangement, a rear, fixed imager lens (e.g. a convex lens) L1, typically of conventional design is provided to focus the image (rays 210, 212) on the sensor 116. In addition, a front variable-geometry (or "variable") lens L2 is provided. In an embodiment, this lens can comprise the above-described membrane-based liquid lens arrangement (i.e. the Optotune membrane-based liquid lens). The focal length/distance of the optical system can be varied within a predetermined range (e.g. 20 cm-to-2 m (or infinity)) based upon the setting of the variable lens L2. This setting is varied by applying force (F) to the perimeter of the membrane using, for example electromagnetic actuation in accordance with known and/or commercially available techniques.

Because certain variable lens types, such as the above-described membrane-based liquid lens can lose calibration of focal distance over time, and more generally because it is desirable to maintain good calibration, the ability to quickly and automatically determine and control focal distance is highly desirable. The use of an external calibration target is not always practical in a runtime environment and can be time-consuming. Alternatively, relying upon acquired images of runtime objects to estimate focal distance can be unreliable and is potentially degraded by inadequate illumination and other variables within the runtime environment. Thus, in accordance with embodiments herein, an integral calibration assembly is provided. This assembly presents a reliable and consistent calibration target (or other fiducial(s)) to the sensor so that focal distance can be continuously determined and updated as desired.

Figure 3:
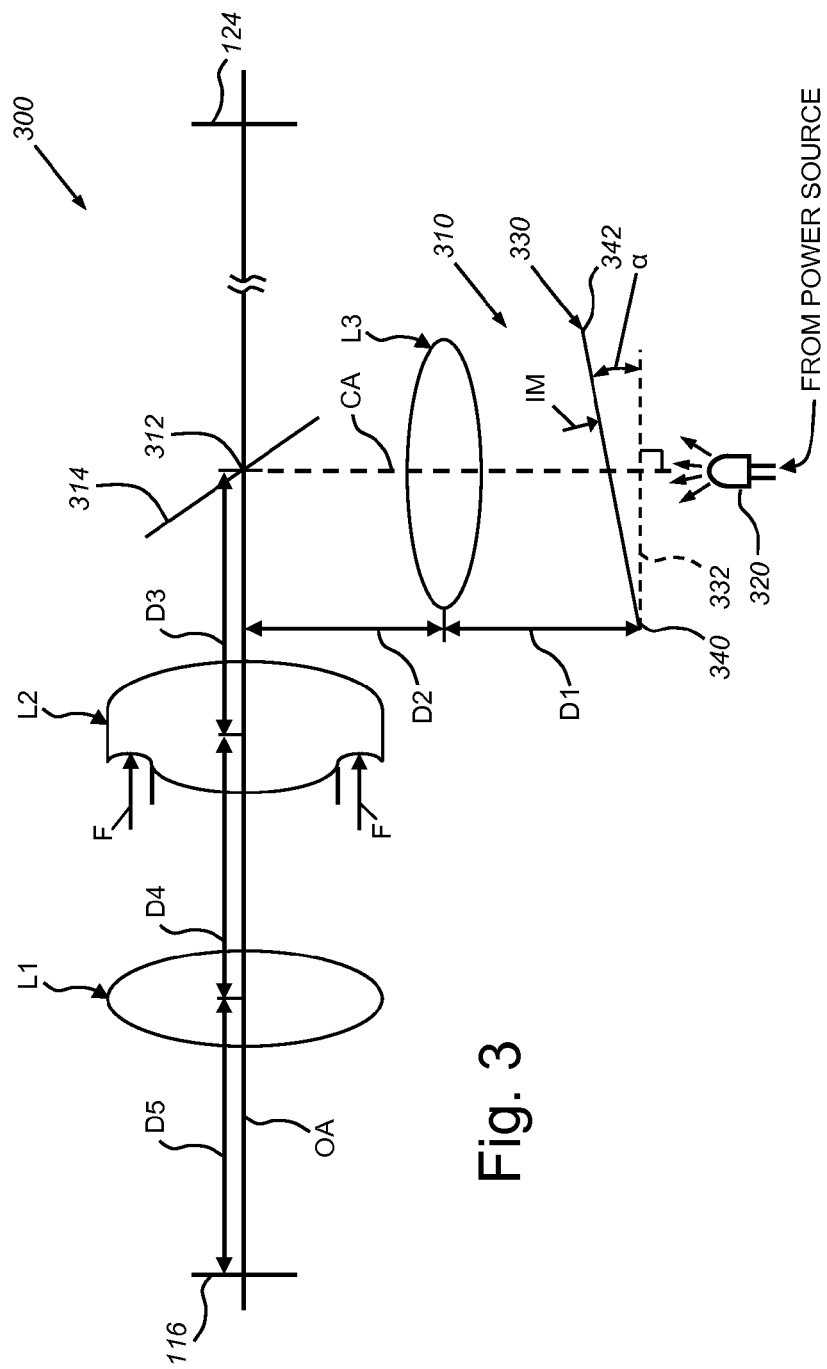
FIG. 3 is a schematic diagram of a lens arrangement as shown in FIG. 2 oriented between an object and an image sensor, and including a calibration assembly based upon a slanted calibration target according to an illustrative embodiment.

Reference is made to FIG. 3, which shows a schematic diagram of an illustrative embodiment of a lens assembly 300. The lenses L1 and L2 (described above, with reference to FIG. 2) are unchanged and reside along the optical axis OA between the sensor 116 and the object 124. A calibration assembly 310 is provided along an axis CA that is perpendicular to the optical axis OA. The calibration assembly axis CA intersects the optical axis at a point 312 in proximity to the front of the variable lens L2 at a 45-degree mirror (i.e. a beam splitter) 314 that reflects light from the calibration assembly 310 onto the optical axis OA to the sensor 116, and also allows light from the object 124 to pass along the optical axis OA to the sensor 116. The calibration assembly 310 includes a convex (or other type) of fixed lens L3 that focuses light from an illuminator 320, such as an LED assembly of predetermined wavelength. This wavelength is highly variable and can be in the visible spectrum or invisible, near infrared (IR). The light from the illuminator passes through a transparent calibration plate 330 that can define alternating transparent/translucent and opaque (e.g. black), parallel lines (or another pattern). The calibration plate 330 is slanted at an acute angle α with respect to the perpendicular plane 332 passing through the axis CA. The slant angle α of the target is highly variable, and generally defines a furthest position 340 from the lens L3 on one end and a closest position 342 on the opposing end thereof. In an embodiment, the angle α is chosen so that, in combination with the lens L3, each parallel, each opaque line represents a different, known focal distance ranging from approximately 20 cm to infinity (by way of example). In an embodiment, the distance D1 of the furthest position 340 of the target 330 from the lens L3 and can represent a focal distance of infinity. As shown a discrete position and associated line can be set to a focal distance of (for example) 1 m. The processor (140) executes a focus process (160 in FIG. 1) to locate this line and/or a line that is in best focus. The system can include stored calibration data (170 in FIG. 1) containing, for example, the known focal distance for each line in the target 330. This data can be arranged, for example as a lookup table that matches lines with predetermined focal distance values and/or information. Based upon this information, the process determines the lens assembly's state of focus using known techniques. The lens L2 is adjusted by the focus process 160 (as described further below) based upon computations for focusing at the exemplary, desired focal distance (e.g. 1 m).

Because the light output from the illuminator 320 can be set significantly higher than the ambient light received by the lens assembly 300 from the object, the projected pattern of target 330 can be differentiated by the sensor 116 when the illuminator is activated (i.e. during a calibration step that can occur between runtime image acquisition steps). Alternatively, the light from the illuminator 320 can be differentiated using a discrete wavelength and/or a non-visible wavelength (e.g. IR) that the sensor is adapted to associate with the calibration target 330. When the illuminator is deactivated during runtime, the sensor reads only ambient light from the object 124. Alternatively, the mirror 314 can be arranged to transmit one wavelength of light whilst reflecting another wavelength. For example, the mirror can be adapted to transmit RED light and reflect BLUE light. The object is illuminated with RED light by an appropriate illuminator (not shown) and the calibration target is illuminated with BLUE light. Deactivating the illuminators allows the sensor to image only red ambient light. In general, it is contemplated that a variety of arrangements of illumination and mirror construction can be used to differentiate between light received from the object and light received from the calibration target.

Based upon the calibration assembly lens L3, the calibration assembly can be relatively small and integrated into the lens assembly. As shown in FIG. 1, an exemplary calibration assembly 180 in accordance with various of the embodiments contemplated herein is mounted along a side of the main lens barrel. The assembly 180 can include internal or external power/data links 182 as appropriate. It should be clear that the form factor of the calibration assembly with respect to the lens is highly variable in accordance with skill in the art. Desirably, the calibration assembly in this and/or other embodiments herein is attached and/or removed as an integral part of the overall lens assembly. In an embodiment, the lens employs a conventional mount arrangement, such as a C-mount. The camera body 112 or another component such as an external processor can include an appropriate port for the power/data link 160 so that the calibration assembly can be removably linked to the body. In one example, a USB-based connection can be employed to power and/or control the calibration assembly of this or other embodiments herein.

In an example, the distance D1 is approximately 25 mm and angle α is approximately 7 degrees (and more generally approximately 5-10 degrees). The optical path distance D2 from the calibration assembly lens L3 to the intersection 312 and D3 from the intersection to the variable lens L2 is approximately 6-12 mm. Likewise the axial spacing D4 of lenses L2 and L1 is approximately 5 mm and the distance D5 between the sensor (116) image plane and imager lens L1 is approximately 20 mm. Lens L1 define a focal length of approximately 20 mm and liquid lens L2 defines a variable focal length in a range of approximately 200 mm to infinity. Lens L3 defines a focal length of approximately 25 mm. These distances and/or values are highly variable in alternate embodiments, and should be taken only by way of a non-limiting example.

Figure 3A:
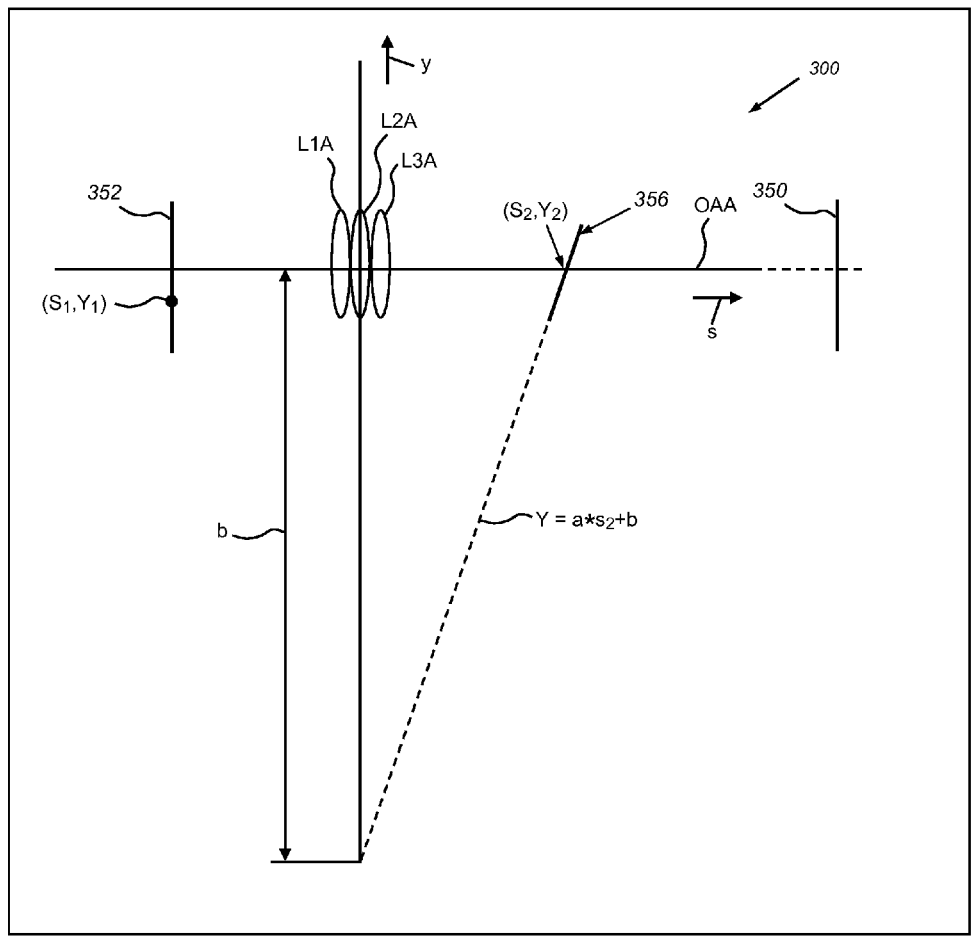
FIG. 3A is a schematic diagram of an idealized representation of the optical system of FIG. 3 showing the computation of focal distance of the liquid lens therein.

More generally the optical system can be characterized as follows and with further reference to the idealized representation of the optical system 300 as shown in FIG. 3A:

For the purposes of this representation, it is assumed that all lenses 1A, L2A and L3A are thin and relatively close to each other along the common optical axis OAA (direction arrow s) when compared to object 350 and the calibrations distances. As such, the optical power of the lenses L1, L2, L3 can be defined respectively as A1, A2 and A3. The distance b is between the calibration target and the optical axis OAA along the y-axis perpendicular thereto (y arrow). In this example L1 and L3 are fixed glass lenses and L2 is a liquid lens with variable optical power. The goal is to measure this lens' power. Point $(s_2,y_2)$ on the calibration focus 356 is imaged (sharp, in focus) on $(s_1,y_1)$ onto the sensor 352. The calibration target is oriented at an angle on a line (dashed) defined by the equation:

$$y_2 = a*s_2 + b \qquad \text{(eq. 1)}$$

It is known that:

$$1/s_1 + 1/s_2 = A1 + A2 + A3 \qquad \text{(eq. 2)}$$

and $$y_1/s_1 = y_2/s_2 \qquad \text{(eq. 3)}$$

thus, combing (eq. 3) into (eq. 1) yields:

$$1/s_2 = y_1/(b*s_1) - a/b \qquad \text{(eq. 4)}$$

and combining (eq. 4 into (eq. 2) yields the power for lens L2:

$$A2 = A1 + A3 - 1/s_1 - y_1/(b*s_1) + a/b.$$

Note that there exists a linear relationship between the position $y_1$ on the sensor 352 where the calibration target is sharply imaged and the optical power A2 of the lens L2.

Figure 3B:
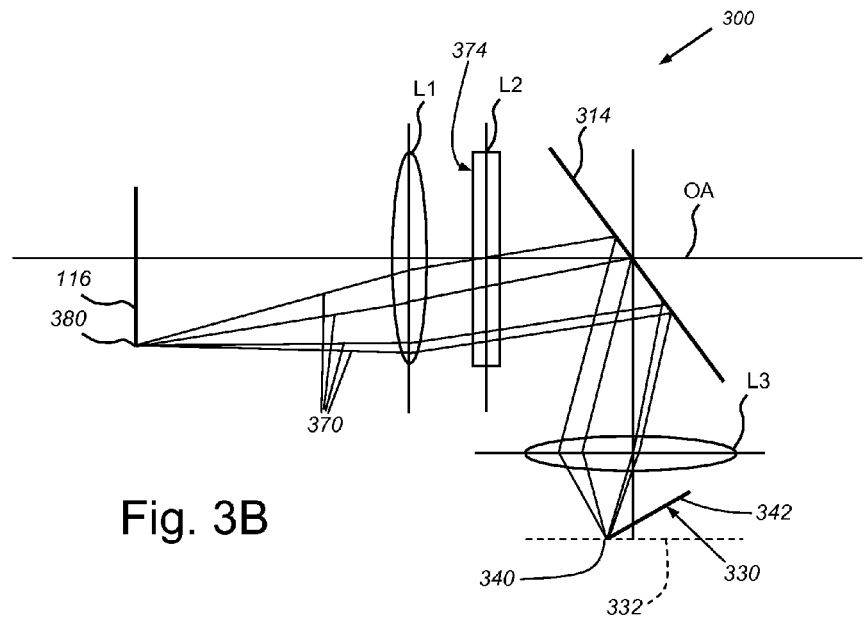
FIGS. 3B and 3C are schematic diagrams of the ray trace of the optical system of FIG. 3 shown for the variable lens at minimum (approximately zero) and maximum optical power, respectively.
Figure 3C:
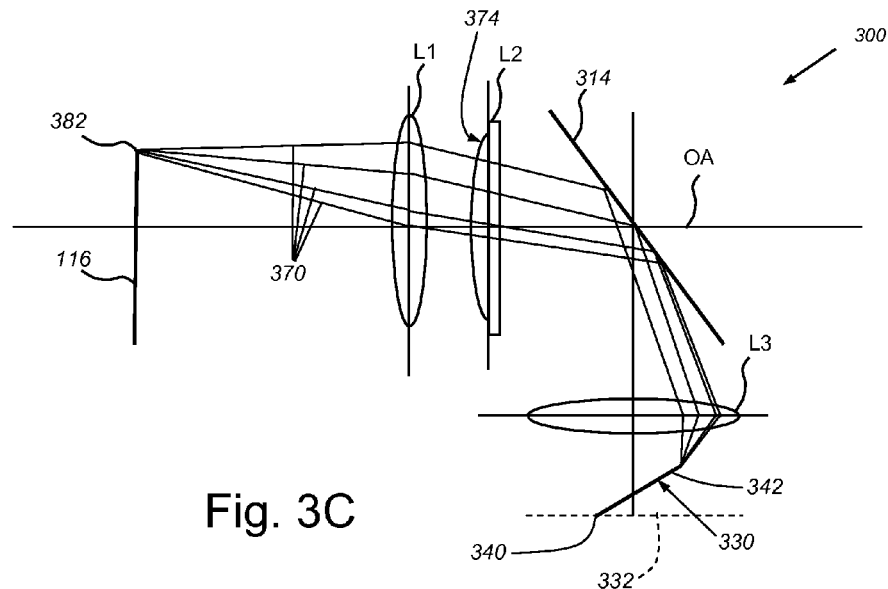

With reference briefly to FIGS. 3B and 3C, the ray trace 370 for the system 300 is shown for the variable lens L2 at minimal power (i.e. magnification A2 set to zero (0) or approximately zero (0)) and at maximum power. At zero (0) power (represented by a flat lens (I2) surface 374), the location 340 on the calibration target 330 is in-focus at location 380 on the sensor 116 (FIG. 3B). At maximum power (represented by a convex lens (L2) surface 374), the location 342 on the target 330 is in-focus at location 382 on the sensor 116 (FIG. 3C). The representation of FIGS. 3B and 3C is illustrative of a variety of arrangements and/or positions in which locations along the target are focused on the sensor.

Figure 4:
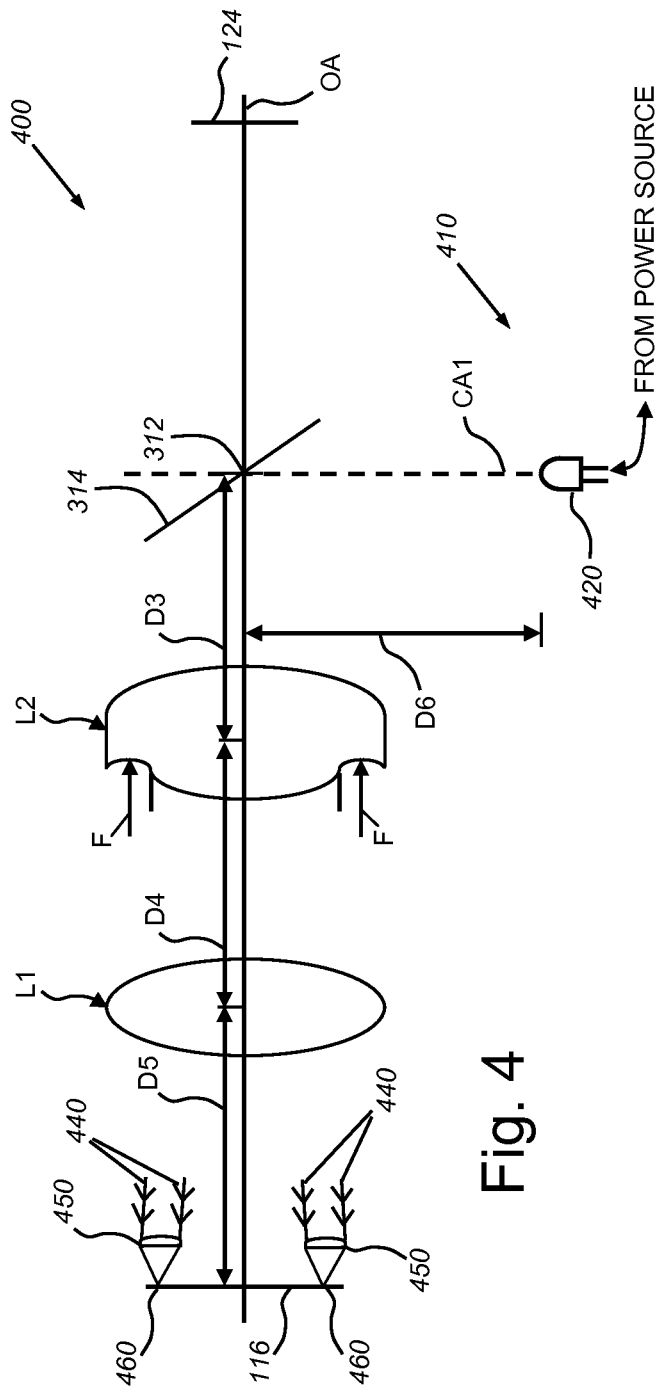
FIG. 4 is a schematic diagram of a lens arrangement as shown in FIG. 2 oriented between an object and an image sensor, and including a calibration assembly based upon an illumination point source and Shack-Hartmann (wave front) sensor according to an illustrative embodiment.

With reference now to FIG. 4, a lens assembly 400 in accordance with a further embodiment is shown schematically. Note that any components and parameters in the lens assembly 400 that are identical or similar to those in the above-described assembly 300 (FIG. 3) are provided with like reference numbers. As shown, the calibration assembly 410 is aligned along an axis CA1 that intersects with the optical axis OA at point 312 in conjunction with the above-described beam splitter 314. In this embodiment a point source illuminator 420 (for example a diode-based illuminator) is selectively operated to project a spherical wave front to the beam splitter 314. The point source 420 is located at a known distance D6 as shown, and can be built into an appropriate structure on the lens assembly as described above. In general, the point source is positioned at a distance of 1/(A1+A2) where A1 is the optical power of fixed lens L1 and A2 is the optical power of variable (liquid) lens L2 The beam is passed through the lenses L2 and L1 and thereafter rays 440 pass through one or more conventional micro lenses 450 that can be located so as to focus the rays 440 on a portion 460 of the sensor 116—for example, near an edge of the sensor's field of view where interference with the main image is minimized. These micro lenses 450 define a basic Shack-Hartmann (wave front) sensor. The portions 460 of the sensor 116 exposed by the micro lenses are monitored by the focus process 160 when the illuminator 420 is activated. Based upon where on a given portion 460 (i.e. which pixel(s) in the sensor array) the point of the focused beam falls, the shift of that point can be used to determine the focal distance of the lens assembly using known computations and stored calibration data (170). The variable lens L2 can be adjusted to achieve the focal distance that places the point(s) generated by the micro lens(es) in the appropriate spot on a given portion 460 of the sensor 116.

Figure 4A:
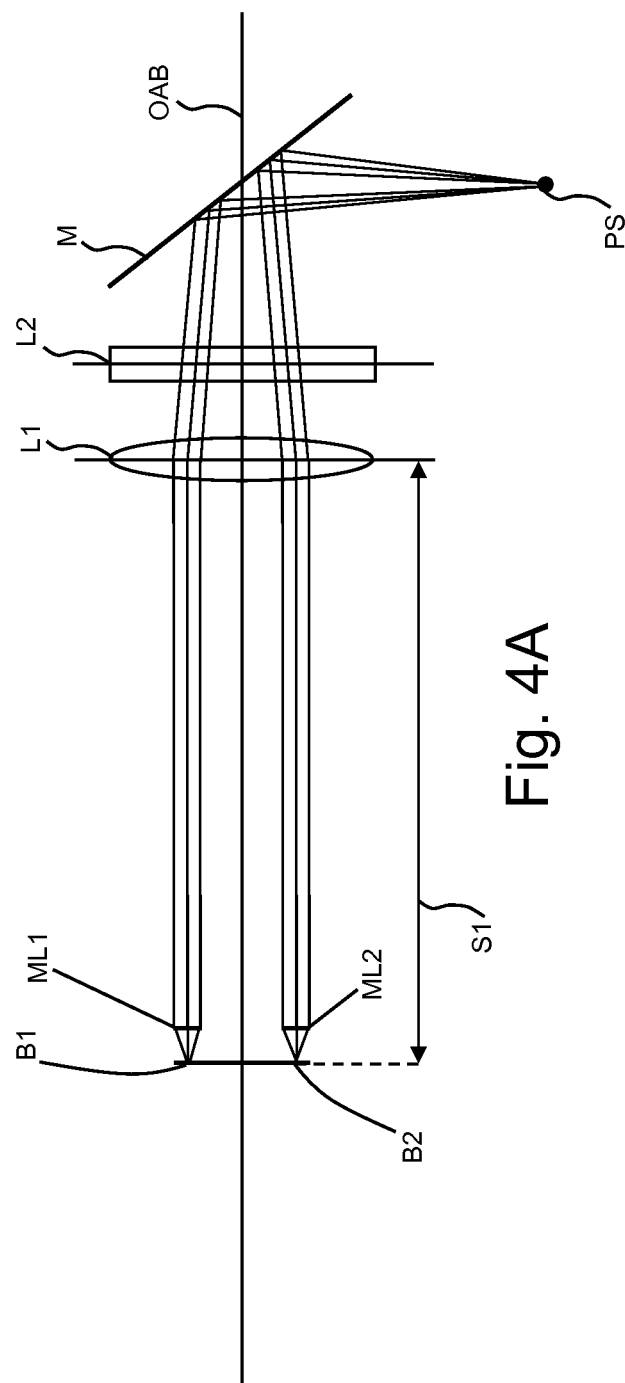
FIGS. 4A and 4B are a schematic diagrams illustrating the computation of the focal distance of the variable lens according to the illustrative Shack-Hartmann embodiment of FIG. 4.
Figure 4B:
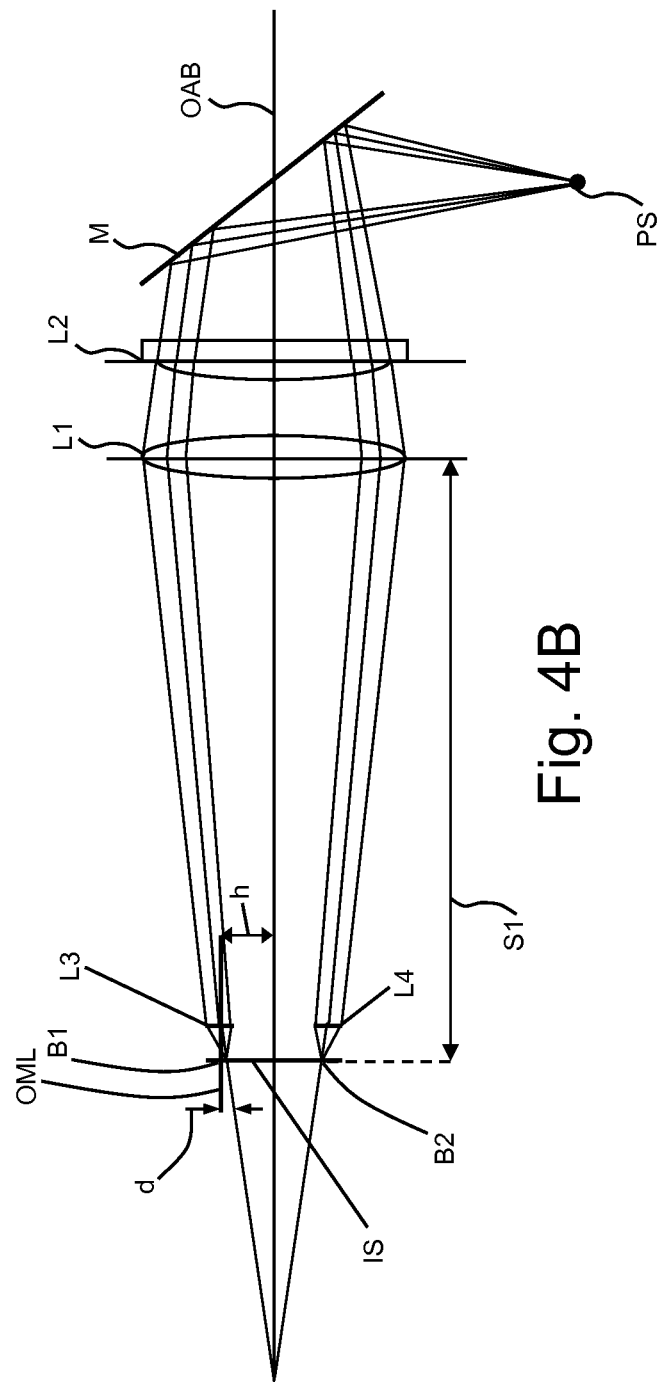

By way of further illustration reference is made to FIGS. 4A and 4B, which each show the optical relationship between components in accordance with the embodiment of FIG. 4. It can be assumed that lenses L1 and L2 are thin and mounted at close distance relative to each other. The optical power of the fixed lens L1 and the variable lens L2 are each defined as A1 and A2, respectively. ML1 and ML2 are micro lenses with focal length f. The image sensor IS is located in the focal plane of each of these lenses. The axis OML of each micro lens ML1 and ML2 is parallel with the optical axis OAB of the system with an offset distance h between axes OML and OAB. Although the position of the point source PS is highly variable, for simplicity in this example, the point source PS is positioned at such an object distance, that when the variable lens L2 is set at zero optical power (A2=0), the spherical beam from the point source PS (via beam-splitting mirror M) is collimated into a planar wave front by variable lens L2 (FIG. 4A). Micro lenses ML1 and ML2 focus this beam of light onto the sensor in two spots B1 and B2 as shown. When varying the optical power A2 of the lens L2, these spots B1, B2 are shifted over a distance d (FIG. 4B). The optical power A2 of the variable lens L2 can be calculated from this distance d (which is, itself, determined by the pixel location of the spots B1, B2 on the sensor IS) with the following equation:

$$A2 = d/(h*f + d*(s_1-f))$$

Figure 5:
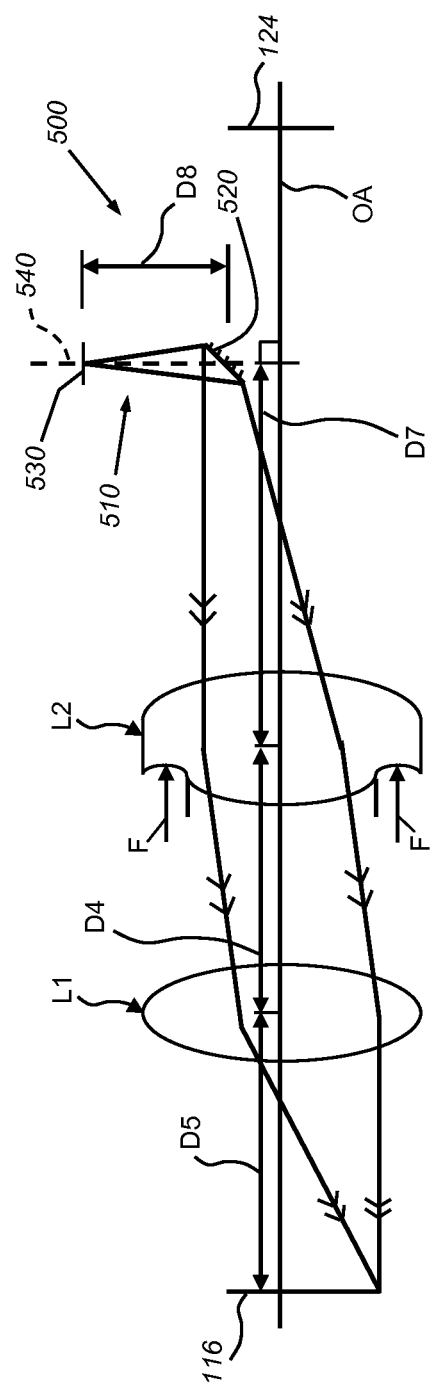
FIG. 5 is a schematic diagram of a lens arrangement as shown in FIG. 2 oriented between an object and an image sensor, and including a calibration assembly based upon redirection of part of the field of view to an integral calibration target according to an illustrative embodiment.

With reference to FIG. 5, another embodiment of a lens assembly 500 is shown and described. Again, any components and parameters in the lens assembly 500 that are identical or similar to those in the above-described assembly 300 (FIG. 3) are provided with like reference numbers. In this embodiment, the calibration assembly 510 uses a small portion of the lens assembly's field of view (typically along an edge thereof), which is covered with a miniature mirror or prism 520. The mirror resides axially between the variable lens L2 and the object 124. In this embodiment, the mirror/prism 520 is located at an axial (e.g. with reference to OA) distance D7 that places it within the barrel of the lens assembly (for example as shown by assembly 180 in FIG. 1). The mirror/prism 520 is angled at approximately 45 degrees with respect to the optical axis OA so that it reflects light from a small calibration target 530 located at a standoff distance D8 above the mirror/prism 520. The plane of the target 530 is shown perpendicular to a dashed line 540 that is, itself, perpendicular to the optical axis OA. The target 530 can be separately illuminated or rely upon ambient light. The target can be any acceptable pattern. In general, the location of projection onto the sensor 116 and appearance of the pattern will vary depending upon the current focal distance as provided by the variable lens L2. Stored calibration data (170) can be used to determine the focal distance based upon the projection on the sensor.

Based upon the arrangement of components shown in FIG. 5 above, the optical power A2 of the Lens L2 is computed based upon the equation:

$$A2 = A1 - 1/s_1 - 1/s_2, \text{ in which}$$

s1 is the lens-to-sensor distance;
s2 is the distance between the lens and calibration target; and
A1 is the optical power of the lens L1.

It is assumed for the purposes of this relationship that the lenses and distances between lenses are small compared to the object-to-sensor distance.

It should be clear that the calibration target 530 can be provided as a plurality of calibration targets located at varying, respective distances. Additionally, it is expressly contemplated that that above-described arrangement in FIG. 5, in which a portion of the field of view is redirected to include an image of a calibration target can be applied in the calibration techniques shown and described with reference to FIGS. 3 and 4 above. That is, the calibration images produced by these methods can be projected onto a portion of the sensor's overall field of view. The calibration image is analyzed within this portion discretely (separately) relative to the remaining field of view that is dedicated to analysis of the runtime object.

Figure 6:
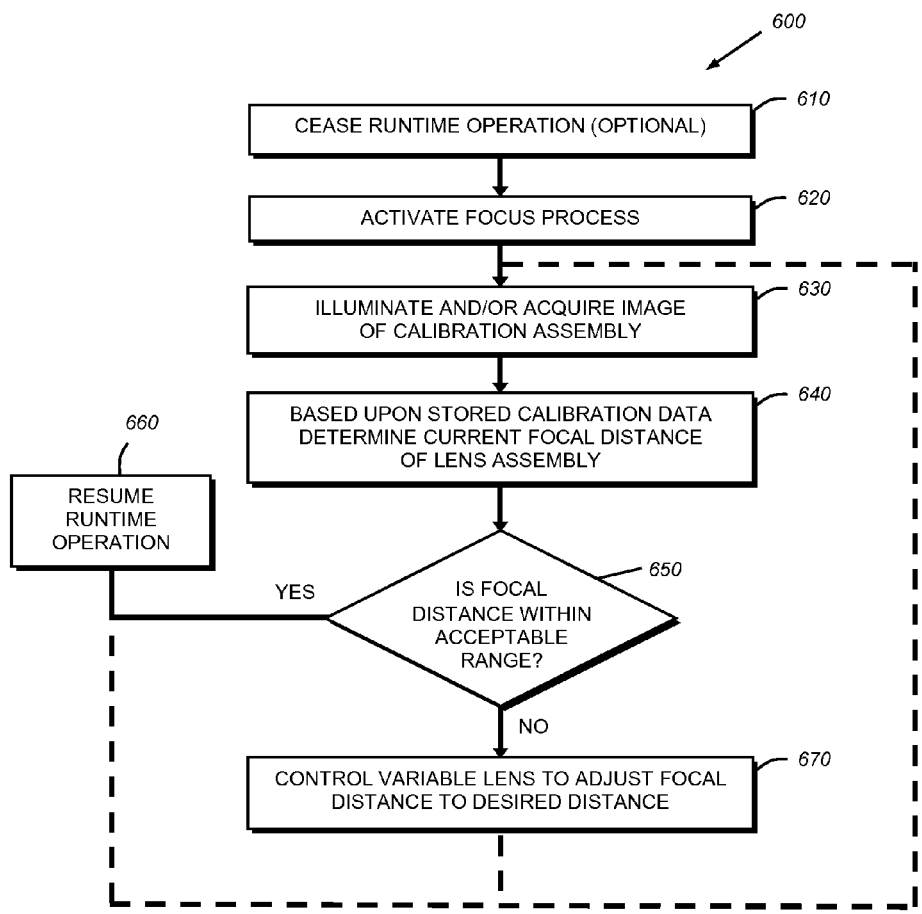
FIG. 6 is a flow diagram of an illustrative procedure for determining and controlling focal distance in a camera assembly including a variable lens and a calibration assembly according to at one of the arrangements of FIGS. 3-5.

Reference is made to FIG. 6, which shows a generalized procedure or process 600 for determining and controlling focal distance of a lens assembly constructed in accordance with each of the arrangements described above. The procedure or process can be carried out at camera initialization, or on a periodic basis during operation. In a symbology-reading application, the calibration process can be carried out immediately after a successful read of a barcode or other symbol on an object. Where the objects are passed through the imaged scene on a conveyor, the height information of a subsequent object is often available (after the previous successful read) and thus, the known height of the subsequent object can be used to set the new focal distance for the reading of this object. The period of operation is highly variable, and the rapid nature of the computations lend themselves to fairly frequent or continuous calibration if desired. In particular, the procedure/process 600 begins, optionally, with an exit from runtime acquisition of object images by the vision processor 140 in step 610. In alternate embodiments, the procedure can occur in combination with, or contemporaneous with, runtime operation—for example in the arrangement of FIG. 5 where a portion of the field of view (not used in runtime image acquisition analysis) is used to analyze the calibration target 530 or where a dedicated wavelength is used to project light to the sensor from the calibration assembly. In either, runtime or non-runtime operation, the procedure 600 next operates to focus process (160) in step 620. Where the integral calibration assembly includes illumination, such illuminator(s) is/are operated in step 630 while the sensor acquired an image of a predetermined pattern from the integral calibration target. Using the acquired image of the pattern on all or a portion of the sensor, the procedure 600 uses stored calibration information and/or data (170) to determine the current focal distance of the lens assembly in step 640. This determination step can include use of a look-up table that maps focal distances to specific image data related to the calibration target pattern and/or projected position (e.g. in the wave front arrangement of FIG. 4) on the sensor. The information 170 can also include conventional equations or formulas that allow for computation of the specific focal distance based upon measured image data from the sensor. For example, in the arrangement of FIG. 3, where a focal distance falls between two lines, equations to interpolate a distance between those lines can be employed to achieve high accuracy.

Having determined the current focal distance in step 640, the procedure 600 can decide whether the focal distance is within a predetermined parameter or range (decision step 650) based upon a programmed value available to the focus process (160). If the focal distance is within parameters, then the procedure 600 resumes runtime value (if exited), or otherwise enters a state of correct focus in step 660. The procedure then awaits the next programmed calibration interval and repeats steps 610-650. If the focal distance is outside a predetermined range, then the procedure controls the variable lens (L2) inn step 670 by exerting appropriate force F (or by other mechanisms) so that its geometry is adjusted to provide the desired focal distance. The control step 670 computes the appropriate setting for the lens using appropriate equations and information related to lens adjustment. For example, if the focal distance is read as 1 m and 2 m is desired, the focus process instructs the lens to change the force F by a predetermined amount that achieves this 2 m setting. If confidence in the reset focal distance is relatively high, then the procedure 600 can optionally branch to the resume runtime step 660 (via dashed line procedure branch 672). Alternatively, if verification of the new setting is desirable, the procedure 600 can return to steps 630-650 (via dashed line procedure branch 674) and determine the new focal distance. This process can repeat (loop) until decision step 650 determines that the desired focal distance has been achieved.

It should be clear that the system and method for determining and controlling focal distance in a lens assembly having a variable (typically liquid) lens is relatively reliable, uses few complex components and can be run rapidly and repeatedly. This system and method integrates relatively well with existing lens arrangements and can be part of a removable and/or replaceable lens system on a vision system camera.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the orientation of calibration assemblies with respect to the optical axis of the lens assembly is highly variable in alternate embodiments and can be varied based upon, for example packaging concerns. The use of appropriate optical components to achieve such a form factor should clear to those of skill. Likewise, while a basic two-lens assembly is shown and described, more complex lens arrangements can be used in conjunction with one or more of the illustrative calibration assemblies described herein. Likewise patterns on any of the calibration targets described herein are highly variable as are the positions on the sensor at which such target patterns (or other calibration images) are projected. Accordingly, this description is meant to be taken only by way of example, and not to otherwise limit the scope of this invention.

What is claimed is:

1. A system for determining focal distance of a lens assembly comprising:
   a liquid lens;
   a calibration assembly integral with the lens assembly, the calibration assembly including a projected pattern of light that variably projects upon a camera sensor receiving light from the lens assembly based upon a focus setting of the liquid lens; and
   a focus process that determines the focal distance of the lens assembly at the focus setting based upon predetermined calibration information with respect to the projected pattern of light.

2. The system of claim 1 wherein the liquid lens comprises a membrane-based liquid lens.

3. The system of claim 1 wherein the liquid lens comprises an iso-density type liquid lens.

4. The system of claim 1 wherein at least one of an appearance or a position of the projected pattern varies based upon the focus setting of the liquid lens.

5. The system of claim 1 wherein the calibration assembly is located so as to project the pattern on an axis approximately perpendicular to an optical axis of the lens assembly through a reflecting surface onto the optical axis.

6. The system of claim 5 wherein the reflecting surface is at least one of a prism or a mirror.

7. The system of claim 1 wherein the focus setting is varied by applying force to the liquid lens.

8. The system of claim 2 wherein the focus setting is varied by applying force to a perimeter of the membrane-based liquid lens.

9. The system of claim 2 wherein the focus setting is varied by electromagnetic actuation.

10. The system of claim 1 wherein the focus process continuously determines and updates the focal distance.

11. The system of claim 1 wherein the focal distance is determined continuously.

12. A method for determining focal distance of a lens assembly including a liquid lens, the method comprising the steps of:
    applying force to the liquid lens to provide a focus setting;
    projecting, with a calibration assembly, a pattern of light that variably projects upon a camera sensor receiving light from the lens assembly based upon the focus setting of the liquid lens; and
    determining the focal distance of the lens assembly at the focus setting based upon predetermined calibration information with respect to the pattern.

13. The system of claim 12 wherein the liquid lens comprises a membrane-based liquid lens.

14. The system of claim 12 wherein the liquid lens comprises an iso-density type liquid lens.

15. The system of claim 13 wherein the force is applied to a perimeter of the membrane-based liquid lens.

* * * * *